United States Patent
Fatula, Jr.

(10) Patent No.: US 7,698,428 B2
(45) Date of Patent: Apr. 13, 2010

(54) APPARATUS, SYSTEM, AND METHOD FOR GRID BASED DATA STORAGE

(75) Inventor: Joseph John Fatula, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 10/736,413

(22) Filed: Dec. 15, 2003

(65) Prior Publication Data

US 2005/0144283 A1 Jun. 30, 2005

(51) Int. Cl.
G06F 12/00 (2006.01)
G06F 17/30 (2006.01)
G06F 15/16 (2006.01)
G06F 15/173 (2006.01)

(52) U.S. Cl. .............. 709/226; 707/204; 709/204; 709/223; 709/224; 709/225

(58) Field of Classification Search ............. 709/224, 709/226; 707/204
See application file for complete search history.

(56) References Cited

U.S. PATENT DOCUMENTS

| | | | | |
|---|---|---|---|---|
| 5,729,715 A | | 3/1998 | Ina et al. .............. | 395/489 |
| 5,771,354 A | * | 6/1998 | Crawford ............. | 709/229 |
| 5,813,017 A | | 9/1998 | Morris ................ | 707/204 |
| 5,819,020 A | | 10/1998 | Beeler, Jr. .......... | 395/182.03 |
| 5,956,733 A | | 9/1999 | Nakano et al. ....... | 707/204 |
| 5,974,563 A | | 10/1999 | Beeler, Jr. ............ | 714/5 |
| 6,131,148 A | | 10/2000 | West et al. | |
| 6,189,079 B1 | * | 2/2001 | Micka et al. ........ | 711/162 |
| 6,324,654 B1 | * | 11/2001 | Wahl et al. .......... | 714/6 |
| 6,505,216 B1 | * | 1/2003 | Schutzman et al. ... | 707/204 |
| 6,526,418 B1 | | 2/2003 | Midgley et al. ...... | 707/204 |
| 6,571,257 B1 | | 5/2003 | Duggan et al. ....... | 707/202 |
| 6,883,110 B1 | * | 4/2005 | Goddard ............. | 714/6 |
| 7,089,383 B2 | * | 8/2006 | Ji et al. .............. | 711/162 |
| 7,213,158 B2 | * | 5/2007 | Bantz et al. .......... | 713/193 |

(Continued)

OTHER PUBLICATIONS

Bhattacharya et al. "Coordinating backup/recovery and data consistency between database and file systems"; International Conference on Management of Data; Year of Publication: 2002.*

(Continued)

*Primary Examiner*—Vivek Srivastava
*Assistant Examiner*—Lin Liu
(74) *Attorney, Agent, or Firm*—Kunzler & McKenzie

(57) ABSTRACT

An apparatus, system, and method are disclosed for backing up data across a plurality of clients on a grid computing system. A sequence management apparatus includes a client request module, a sequence module, and packet storage module. The sequence module is configured to receive data to be backed up from a source client. The sequence module is configured to generate a non-transparent sequence key that identifies one or more target clients on the grid computing system. The packet storage module is configured to store a backup copy of the data from the source client on the plurality of target clients according to the non-transparent sequence key. The non-transparent sequence key may be generated by and known only to the sequence management apparatus in order to maintain a minimum security level for the data backed up on the plurality of target clients.

44 Claims, 13 Drawing Sheets

U.S. PATENT DOCUMENTS

| | | | |
|---|---|---|---|
| 7,296,088 B1 * | 11/2007 | Padmanabhan et al. | 709/238 |
| 2002/0013832 A1 | 1/2002 | Hubbard | |
| 2002/0124137 A1 | 9/2002 | Ulrich et al. | 711/113 |
| 2002/0169877 A1 * | 11/2002 | Bantz et al. | 709/226 |
| 2002/0184249 A1 | 12/2002 | Shibata | 707/204 |
| 2002/0194340 A1 | 12/2002 | Ebstyne et al. | |
| 2004/0039829 A1 * | 2/2004 | Bucher | 709/229 |
| 2004/0083245 A1 * | 4/2004 | Beeler, Jr. | 707/204 |

OTHER PUBLICATIONS

Bolosky et al. "Feasibility of a serverless distributed file system deployed on an existing set of desktop PCs"; Joint International Conference on Measurement and Modeling of Computer Systems; Year of Publication: 2000.*

Official Action from the Canadian Patent Office, Apr. 1, 2009.

* cited by examiner

| Network Identifier 602 | Network Allocation 604 | Client Identifier 606 | Client Packet Compression 608 | Client Packet Redundancy 610 | Client Packet Encryption 612 | Client Backup Proximity 614 |

| Client Packet Proximity 616 | Client Storage 618 | Client Processor 620 | Client Bandwidth 622 | Client Synch. 624 | Client Auto Archive 626 |

Global Client Profile 600

FIG. 6

| Source Client Identifier 702 | Unique Data Identifier 704 | Data Source Location 706 | Data Packet Compression 708 | Data Packet Redundancy 710 | Data Packet Encryption 712 |

| Data Backup Proximity 714 | Data Packet Proximity 716 | Data Synch. 718 | Data Sequence Key 720 |

Source Client Profile 700

FIG. 7

Source Data Record

| Unique Data Identifier 802 | Packet Identifier 804 | Target₁ 806 | Target₂ 808 | ... | Target_N 810 |
|---|---|---|---|---|---|

Target Data Record

| Unique Data Identifier 902 | Packet Identifier 904 | Packet Size 906 | Target Location 908 |
|---|---|---|---|

APPARATUS, SYSTEM, AND METHOD FOR GRID BASED DATA STORAGE

BACKGROUND OF THE INVENTION

1. Field of the Invention

This invention relates to grid computing and more particularly relates to backing up data across multiple clients on a grid computing system.

2. Description of the Related Art

Grid computing is a relatively new technology in the computing industry. Many current grid computing systems are designed to allow multiple interconnected computers to work together on large grid applications, such as computational problems, that would be impossible to do on a single machine. In order to feasibly manage such overwhelming amounts of computational processing, the computational problem may be divided into several smaller, more manageable jobs. This type of shared processing of grid application(s) is possible in part because of the enforced or incidental idle processor time of many personal and business computers.

One aspect of grid computing that has not been sufficiently implemented is in the area of data backup applications. Conventional data backup facilities are implemented using large, standalone data backup devices. In fact, entire industries are devoted to creating data centers that are dedicated to storing information, backing up information, and making that information available. To increase the availability of this stored information, data centers often employ redundancy and error detection and correction codes or features. Such data centers are conventionally designed and operated using large banks of data storage devices dedicated solely to storing data. Unfortunately, these and other conventional data storage techniques and devices are typically very expensive, even cost-prohibitive, and in this way limit the widespread use of such technologies.

Another issue that is related to grid computing is the pervasiveness of large capacity storage devices on individual and networked computers. Many businesses and households, at least in the United States, currently have one or several computers that may be connected to the internet frequently, if not constantly, throughout the day. Many of these personal and business computers under-utilize their storage, possibly using between 2% and 20% of their overall capacity. With the size of storage devices available on these computers, this means, for example, that between 32 and 98 Gigabytes of storage space is not used or under-utilized on storage devices of between 40 and 100 Gigabytes. Even on lower capacity devices, several Gigabytes of storage may be left unused. In all, millions (probably billions) of dollars worth of storage may go unused every day.

A further issue related to the background of the present invention is the need for substantial storage capacity for data backup operations. Although the storage capacities for low cost removable media, such as compact and floppy disks, has grown significantly over time, the necessary storage space for a complete or partial backup many times exceeds that available on a single removable media device. Likewise, the time, effort, and financial costs involved in storing backup data on several removable media devices is typically prohibitive. This need for high capacity storage for backing up data, combined with the capabilities of grid computing and the substantial amount of existing unused and under-utilized storage space, suggest that a need exists to implement grid-based data backup.

Consequently, a need exists for an apparatus, system, and method that facilitate favorable backup and restore functionality on a grid computing system. Beneficially, such an apparatus, system, and method would overcome the current dependence on dedicated data centers, as well as make use of the available, unused storage capacity and grid computing techniques.

BRIEF SUMMARY OF THE INVENTION

The present invention has been developed in response to the present state of the art, and in particular, in response to the problems and needs in the art that have not yet been fully solved by currently available grid computing systems. Accordingly, the present invention has been developed to provide an apparatus, system, and method for backing up data across a plurality of clients on a grid computing system that overcome many or all of the above-discussed shortcomings in the art.

The apparatus for backing up data across a plurality of clients on a grid computing system is provided with a logic unit containing a plurality of modules configured to functionally execute the necessary steps of backing up data across a plurality of clients on a grid computing system. These modules in the described embodiments include a client request module, a sequence module, a global profile management module, a packet storage module, a packet retrieval module, a data assembly module, a compression module, an encryption module, and a redundancy module.

A system of the present invention is also presented for backing up data across a plurality of clients on a grid computing system. The system may be embodied in a local area network, a wide area network, a combination of local and wide area networks, one or more wireless networks, an internet-based grid computing network, or any other number of grid computing environments. In particular, the system, in one embodiment, includes a global sequence manager, a source client, one or more target clients, and a communications infrastructure that allows communication among these components.

The system may further include a subscription manager configured to manage a fee subscription for each of the clients connected to the grid computing system and using the backup and restore functionality of the grid system described herein.

A client is also presented for backing up data across a plurality of clients on a grid computing system. In one embodiment, the client is provided with a logic unit containing a plurality of modules configured to functionally execute the necessary steps of backing up data across a plurality of clients on a grid computing system. These modules in the described embodiments include a data backup module, a data restore module, local profile management module, and a unique data identifier generation module.

A process of the present invention is also presented for backing up data across a plurality of clients on a grid computing system. The process in the disclosed embodiments substantially includes the steps necessary to carry out the functions presented above with respect to the operation of the described apparatus and system. In one embodiment, the process includes receiving data to be backed up from a source client, generating a non-transparent sequence of a plurality of target clients, and storing the data on the plurality of target clients according to the non-transparent sequence.

The process also may include managing metadata information descriptive of the backup data, subdividing the data into backup data packets, creating and identifying the backup data using a unique data identifier (UDI), managing a client subscription to the grid computing backup system, tracking allocation of a client performance resource, as well as other necessary, incidental, and beneficial steps as described herein.

One embodiment of the present invention beneficially allows large amounts of backup data to be dispersed and stored among several target clients in a grid computing system. Another embodiment of the present invention also beneficially allows data to be backed up without a need for large data centers. A further embodiment of the present invention beneficially provides additional security for the backup data by subdividing the data into packets and storing the backup data packets on the target clients according to a non-transparent sequence key.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a schematic block diagram illustrating one embodiment of a global client profile in accordance with the present invention;

FIG. 7 is a schematic block diagram illustrating one embodiment of a source client profile in accordance with the present invention;

FIG. 8 is a schematic block diagram illustrating one embodiment of a source data record in accordance with the present invention;

FIG. 9 is a schematic block diagram illustrating one embodiment of a target data record in accordance with the present invention;

DETAILED DESCRIPTION OF THE INVENTION

Figure 1:
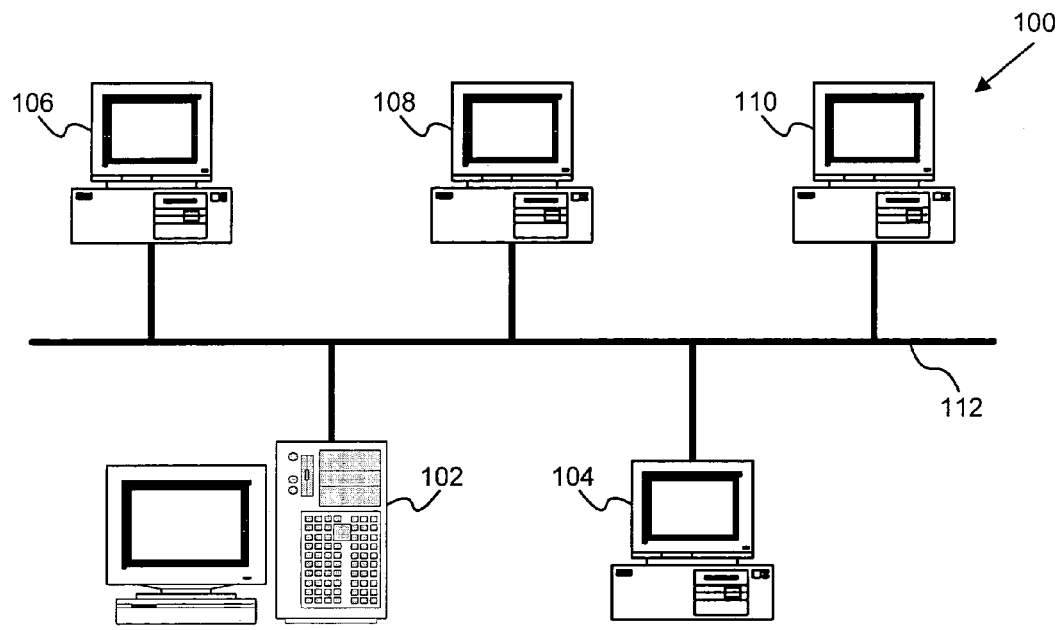
FIG. 1 is a schematic block diagram illustrating one embodiment of a grid system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, databases, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a grid system 100 that comprises a grid server 102 connected to multiple clients 104-110, or nodes, via a communications channel 112. The illustrated grid system 100 is similar to a local area network (LAN), and the communications channel 112 may be, in one embodiment, an Ethernet communications channel, a wireless communications channel, or another equivalent communications channel. Likewise, the communications channel 112 may comprise a combination of various types of communications channels. Although the depicted grid system 100 includes one grid server 102 and four clients 104-110, the grid system 100 may comprise a combination of various network configurations having fewer or more clients 104-110, more than one server 102, or alternate server configurations. In a further embodiment, the grid system 100 also may include a subscription manager (not shown) as described with reference to FIG. 3. In one embodiment, the grid server 102 may concurrently act as the subscription manager of the grid system 100.

The grid system 100 is configured, in one embodiment, to execute a grid application. A grid application is a collection of work items that together achieve a specified objective. For example, a grid application may determine very complex mathematical calculations, including weather forecasting, stock market development, and so forth. A grid application also may process large-scale multimedia operations. In another embodiment, a grid application may perform data backup operations on large and diverse amounts of data. Although the present invention may apply to myriad other grid applications and functions, the following description will focus on data backup operations within a grid computing environment.

A grid application may be divided into jobs, or single units of work. The several jobs of a grid application may be executed concurrently, serially, or co-dependently on one or more of the various nodes 104-110. Each of the nodes 104-110 may allocate certain performance resources to the grid system 100 for execution of grid applications. These performance resources made available by the clients 104-110 may include processor capability, processor capacity, storage capacity, memory capacity, and other similar resources. In one embodiment, a client 104-110 may dedicate a specific amount of total processor capability, storage capacity, or memory capacity to the grid system 100 for execution of grid applications.

Each client 104-110 may act as either a source client or a target client, depending on the role of the client 104-110 in a particular grid application. For example, where the client 104-110 initiates a grid application, the client 104-110 acts as a source client. Alternately, where the client 104-110 makes local performance resources available for execution of a remotely initiated grid application, the client 104-110 acts as a target client. For example, in the case of a grid backup operation, a source client may have backup data files on one or more target clients where the target clients allocate some available storage to the grid system 100 for such backup grid applications.

Figure 2:
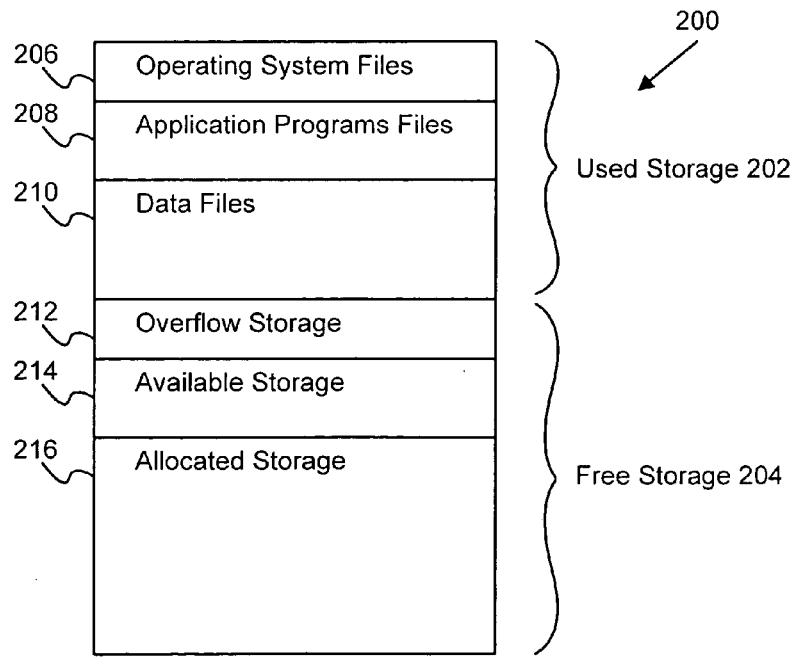
FIG. 2 is a schematic block diagram illustrating one embodiment of a client storage in accordance with the present invention.

FIG. 2 depicts one embodiment of a client storage 200 within the grid system 100 of FIG. 1. In the illustrated embodiment, the storage 200 on a particular client 104-110 may comprise used storage 202 and free storage 204. The used storage 202 is electronic storage space that stores data, including operating system files 206, application program files 208, data files 210, and so forth. The free storage 204 is electronic storage space that is not specifically used for operation of or storage by the client 104-110.

The free storage 204, in one embodiment, may include overflow storage 212, available storage 214, and allocated storage 216. Overflow storage 212 may be storage space reserved for execution of application programs, similar to a page file in the Windows™ operating system. The allocated storage 216 is storage space that may be dedicated to the grid system 100 for execution of grid applications and storage of grid data. The allocated storage 216 will be discussed in detail throughout the description that follows. The available storage 214 may be storage space that is not currently used as either overflow storage 212 or allocated storage 216 and is reserved for future use by the client 104-110.

Although FIG. 2 depicts specific types of used storage 202 and free storage 204, the storage 200 of a particular client 104-110 on the grid system 100 may vary in size, capacity, usage, availability, and in particular in the amount of allocated storage 216 that is dedicated to the grid system 100. The storage 200 of a particular client 104-110 may also vary over time with regard to the amount and allocation of used storage 202 and free storage 204 and subdivisions thereof. In one embodiment, the allocated storage may be minimal relative to the total storage 200 on the client 104-110. Alternately, the allocated storage 216 may include all of the free storage 204 except for the overflow storage 212, in which case the client 104-110 would not have available storage 214 as defined above.

Figure 3:
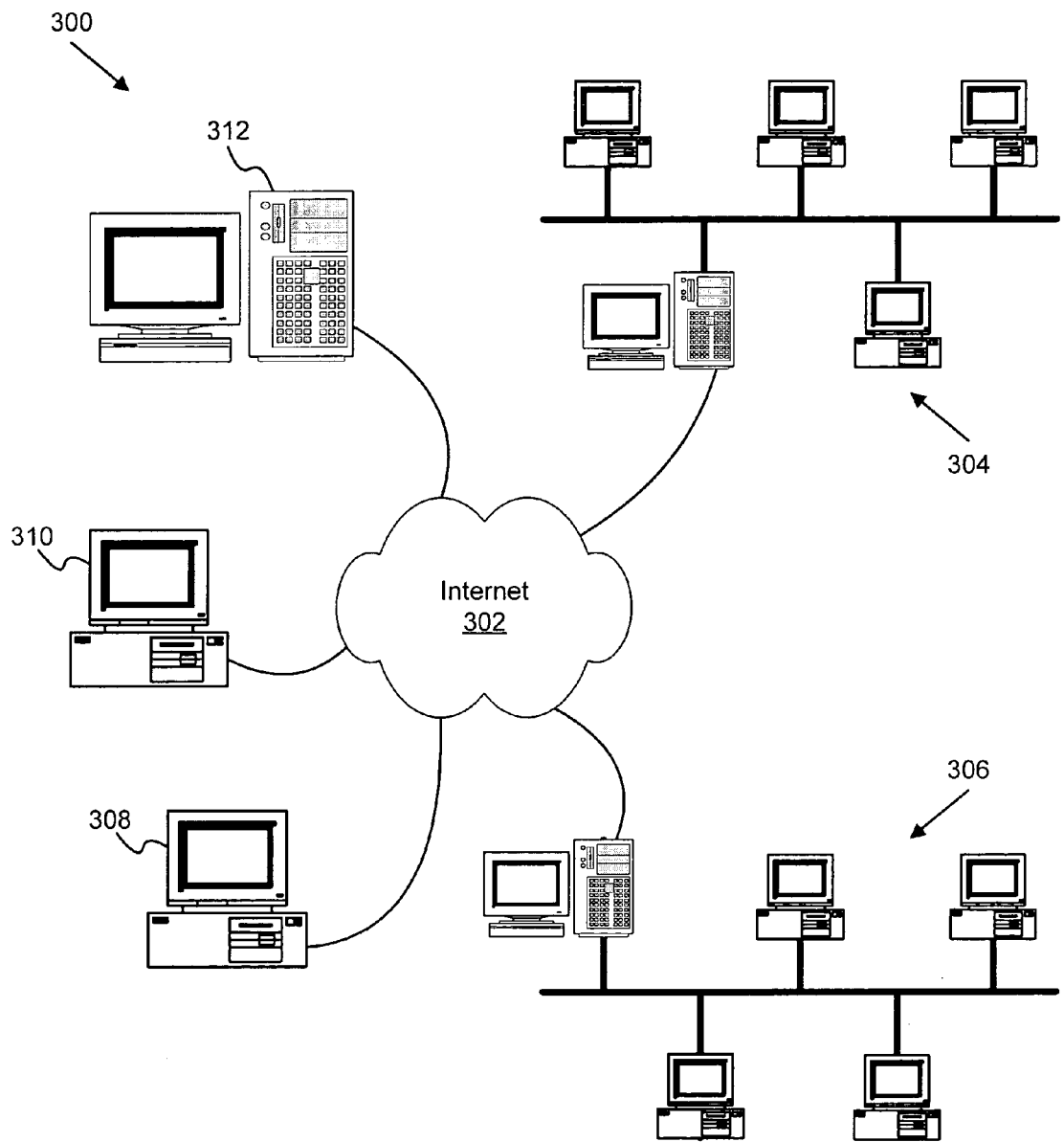
FIG. 3 is a schematic block diagram illustrating another embodiment of a grid system in accordance with the present invention.

FIG. 3 depicts another embodiment of a grid system 300 that is similar in some aspects to the grid system 100 of FIG. 1. The illustrated grid system 300 operates over the internet 302, which provides a communications channel among the various other components of the grid system 300. The illustrated grid system 300 also includes network systems 304, 306, which are similar to the grid system 100 shown in FIG. 1, that form sub-systems within the grid system 300 of FIG. 3. Additionally, the grid system 300 may include other clients 308, 310 that are directly connected to the internet in that they are not a part of a local network.

The grid system 300 also may include a subscription manager 312 that will be described in more detail later in this description. The subscription manager 312 may alternatively be connected to other network systems 304, 306 within the grid system 300. In a further embodiment, there gird system 300 may have multiple subscription managers 312 that each manages independently defined subscription groups.

As mentioned above, other similar grid system configurations may be employed in place of or in addition to the grid systems 100, 300 depicted in FIGS. 1 and 3. In the following description, reference to either of the grid systems 100, 300 is meant to interchangeably refer to either or both of the grid systems 100, 300, unless the exclusion of one of the grid systems 100, 300 is explicitly noted.

Figure 4:
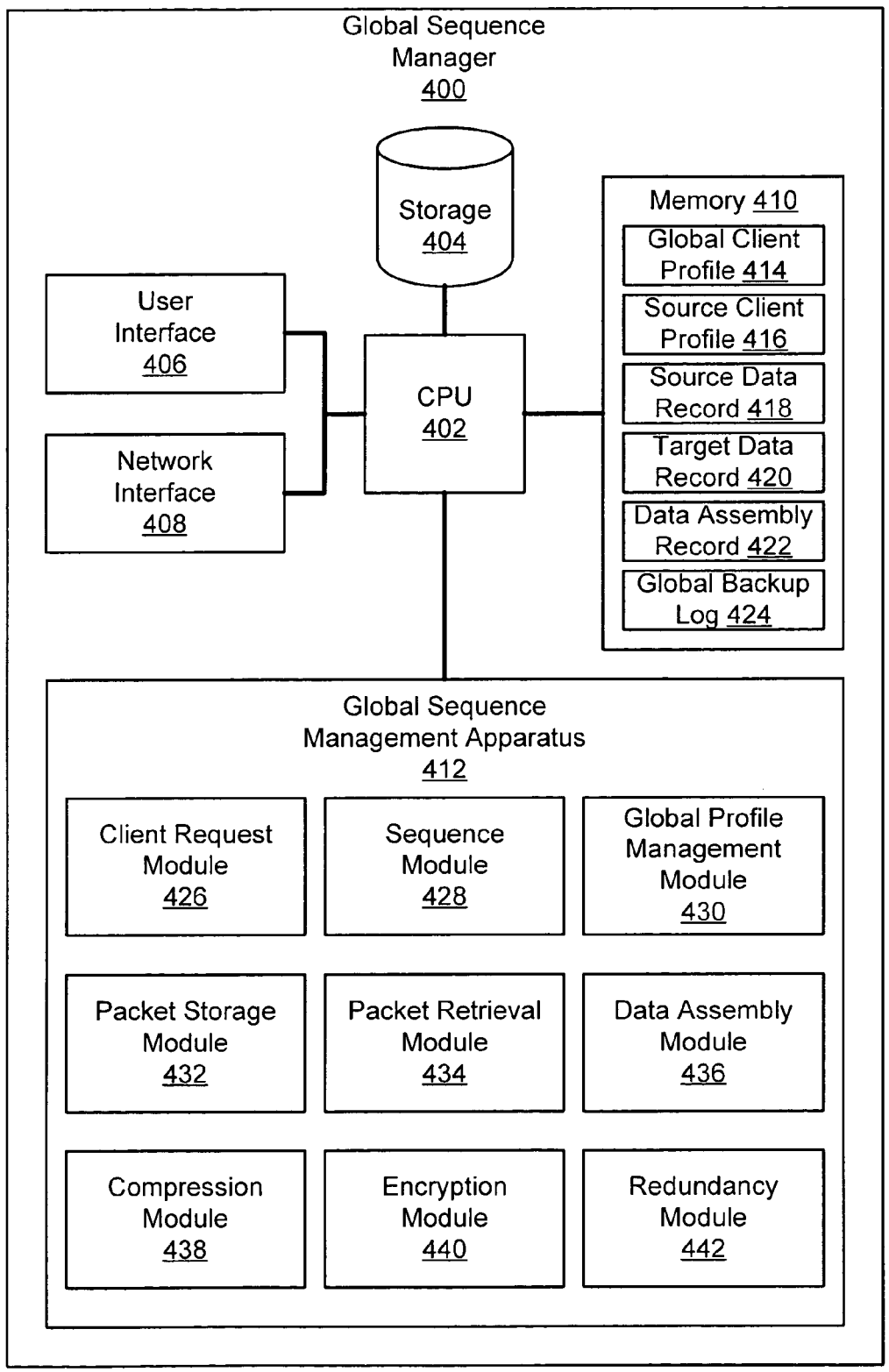
FIG. 4 is a schematic block diagram illustrating one embodiment of a global sequence manager in accordance with the present invention.

FIG. 4 depicts one embodiment of a global sequence manager 400. The illustrated global sequence manager 400 is configured, in one embodiment, to manage data backup operations on the grid system 100. In one embodiment, the global sequence manager 400 includes a central processing unit (CPU) 402, a local storage device 404, a user interface 406, a network interface 408, a memory 410, and a global sequence management apparatus 412. The CPU 402 is configured generally to execute operations within the global sequence manager 400. The user interface 406, in one embodiment, is configured to allow a user to interact with the global sequence manager 400, including allowing input data and commands from a user and communicating output data to the user. The network interface 408 is configured, in one embodiment, to facilitate network communications of the global sequence manager 400 over the communications channel 112 of the grid network 100.

The local memory 410 is configured, in one embodiment, to store several data and metadata files that may be used in conjunction with a grid backup operation. In an alternative embodiment, some or all of these data and metadata files may be replicated in the local storage device 404. In a further embodiment, one or all of these data and metadata files may be stored exclusively in the local storage device 404 rather than in the memory 410. In another embodiment, one or all of these data and metadata files may be stored in distributed storage on the grid system 100. Although the present description refers to "files," the present invention is understood to operate in substantially the same manner using other electronic memory and storage structures. Reference herein to a data file or metadata file is understood to equivalently refer to other such electronic memory and storage structures.

In particular, the memory 410 may store a global client profile 414, a source client profile 416, a source data record 418, a target data record 420, a data assembly record 422, and a global backup log 424. The global client profile 414, in one embodiment, is configured to store a network profile and also may store a default client profile. The global client profile 414 will be discussed in more detail with reference to FIG. 6. The source client profile 416, in one embodiment, is configured to store a unique client profile and, in a further embodiment, may store a data unit profile. The source client profile 216 will be discussed in more detail with reference to FIG. 7.

The source data record 418, in one embodiment, is configured to store metadata regarding backup data files, or portions thereof, stored on one or more target clients. Similarly, the target data record 420, in one embodiment, is configured to store metadata regarding backup data files, or portions thereof, stored on one or more target clients. The source data record 418 and target data record 420 for a single file, or portion thereof, may contain similar or partially replicated metadata about the backup file. The source data record 418 and target data record 420 will be discussed in more detail with reference to FIGS. 8 and 9, respectively.

The data assembly record 422, in one embodiment, is configured to store information about the order in which several packets of information pertaining to a single backup file should be assembled so that the restored backup file accurately reflects the information stored in the file that was originally backed up. The data assembly record 422 will be discussed in more detail with reference to FIG. 10. The global backup log 424, in one embodiment, may be configured to store a backup history that logs one or more global backup grid application operations over a period of time. In this way, the global backup log 424 may facilitate reviewing a backup history, as well as possibly restoring a grid or client status that existed prior to execution of a given backup grid application.

The global sequence management apparatus 412 is configured, in one embodiment, to facilitate data backup operations across the grid system 100. The global sequence management apparatus 412 may manage the execution of backup and restore operations that are initiated by a particular source client. The illustrated global sequence management apparatus 412 includes a client request module 426, a sequence module 428, a global profile management module 430, a packet storage module 432, a packet retrieval module 434, a data assembly module 436, a compression module 438, an encryption module 440, and a redundancy module 442.

In one embodiment, the client request module 426 is configured to process a request from a source client to back up one or more files. The client request module 426 may be further configured to receive the data to be backed up from the source client. The sequence module 428, in one embodiment, may be configured to generate a non-transparent sequence key that identifies one or more target clients on which the backup data may be stored. The non-transparent sequence key may be exclusively stored on and accessible by the global sequence manager so as to provide a level of security for the backup data. The non-transparent character of the sequence key refers to its uniqueness and the exclusivity of its generation, accessibility, and duplication.

For example, a global sequence manager may back up data from a source client on a plurality of target clients by storing packets, or portions, of the data on each of the plurality of target clients. Since portions of the data from the source client may be stored on the local storage device of remote target clients, one level of data security may be provided by storing the backup data packets on several different target clients in an order that is known only to the global sequence manager 400. In this way, even though a portion of the data may be accessible on a particular target client (although the backup data also may be encrypted, adding a second layer of security), it may be extremely difficult or even impossible to substantially or fully reassemble the data originally stored on the requesting source client. It follows that as the size of these portions of data which are stored on different target clients becomes smaller, the level of data security may increase.

The global profile management module 430, in one embodiment, may facilitate management of default and unique client profiles, including profiles for individual networks connected within the grid system 100. In one embodiment, the global profile management module 430 may allow a user to define the global client profile 414 and the source client profile 416 described above and discussed in more detail with reference to FIGS. 6 and 7, respectively.

The packet storage module 432 is configured, in one embodiment, to store the backup data from a source client on one or more target clients in the grid system 100. In one embodiment, the packet storage module 432 may subdivide the backup data into packets of equal or disproportionate size prior to storing the backup data on the target clients. In a further embodiment, the packet storage module 432 may store the backup data packets on one or more target clients according to the non-transparent sequence key generated by the sequence module 428. In a further embodiment, the packet storage module 432 may store the backup data on the target clients after allowing the backup data to be compressed by the compression module 438, encrypted via the encryption module 440, or duplicated by the redundancy module 442. In the case of replicated data, the packet storage module 432 also may store the replicated backup data according to the non-transparent sequence key. In one embodiment, the packet storage module 432 also may be configured to create or store one or more of the source data record 418, the target data record 420, and the data assembly record 422.

The packet retrieval module 434 may be configured, in one embodiment, to retrieve the backup data packets, or a copy thereof, from the target clients on which the packets may be stored. In one embodiment, the packet retrieval module 434 may employ the same or a similar non-transparent sequence key as was used by the packet storage module 432 to previously store the backup data packets on the target clients.

The data assembly module 436, in one embodiment, may be configured to assemble multiple backup data packets into a comprehensible format that is similar, if not identical, to the format of the original data file prior to subdivision. In one embodiment, the data assembly module 436 may assemble the restored data according to the data assembly record 422 created approximately at the time that the original data was subdivided into packets and stored on the target clients.

As was mentioned above, the compression module 438, encryption module 440, and redundancy module 442 each may modify the backup data prior to the data being stored on one or more target clients. Likewise, the compression module 438, encryption module 440, and redundancy module 442 may be used independently or together to restore the data to its original format through decompression, decryption, and so forth.

Figure 5:
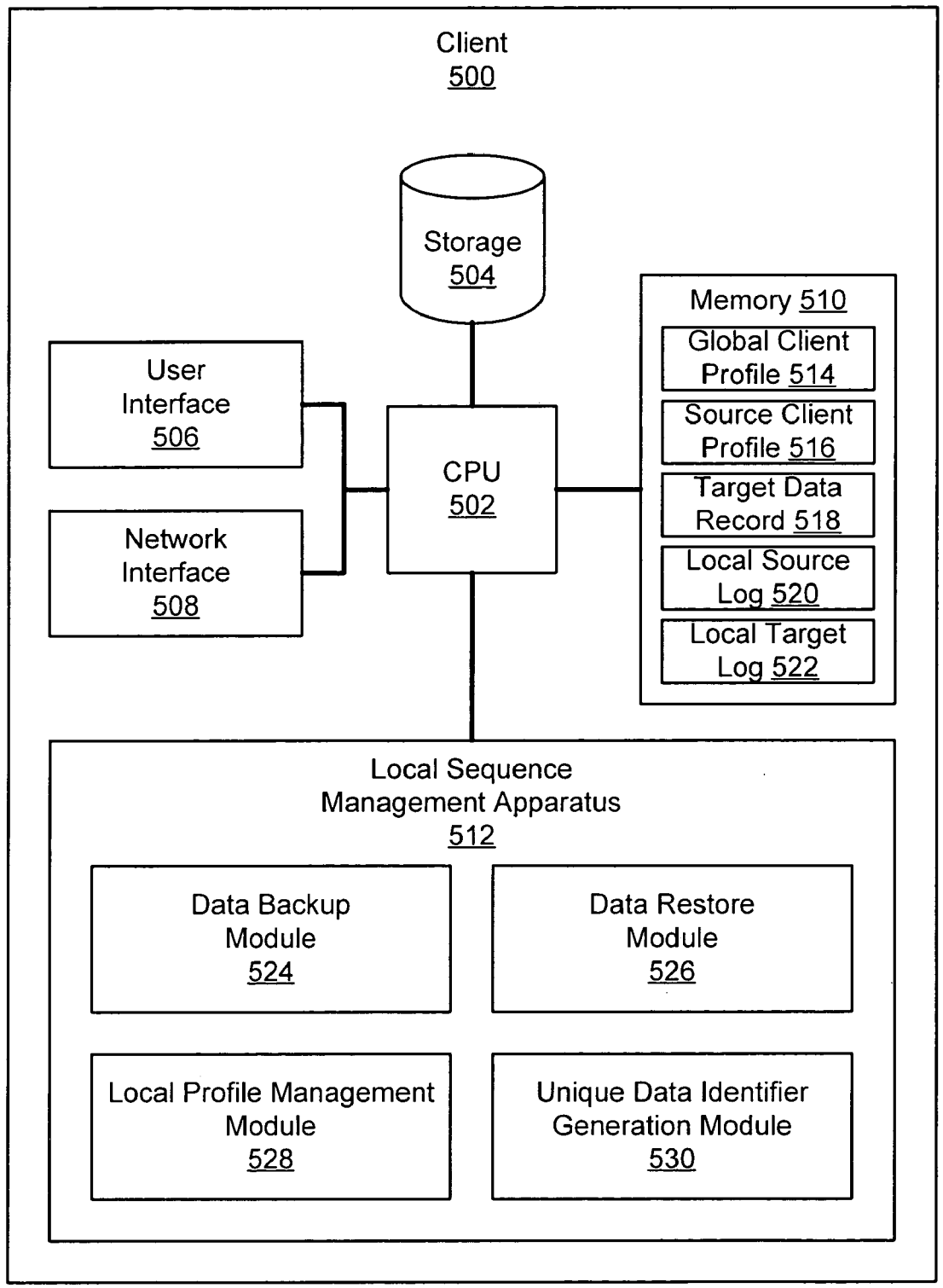
FIG. 5 is a schematic block diagram illustrating one embodiment of a client in accordance with the present invention.

FIG. 5 depicts one embodiment of a client 500 that may operate as either a source client or a target client within the grid system 100. Like the global sequence manager 400 of FIG. 4, the client 500 includes a CPU 502, a local storage device 504, a user interface 506, a network interface 508, and a memory 510. The illustrated client 500 also includes a local sequence management apparatus 512. The CPU 502, user interface 506, and network interface 508 of the client 500 are substantially similar to the CPU 402, user interface 406, and network interface 508 of the global sequence manager 400. The local storage device 504 is similar to the storage 200 of FIG. 2 and may be divided, in one embodiment, as described with reference to FIG. 2. For example, in one embodiment, the storage 504 may comprise used storage 202 (including operating system files 206, application program files 208, and data files 210) and free storage 204 (including overflow storage 212, available storage 214, and allocated storage 216).

The memory 510 is configured, in one embodiment, to store several data and metadata files that may be used in conjunction with a grid backup operation. In an alternative embodiment, some or all of these data and metadata files may be replicated in the local storage device 504. In a further embodiment, one or all of these data and metadata files may be stored exclusively in the local storage device 504 rather than in the memory 510. In another embodiment, one or all of these data and metadata files may be stored in distributed storage on the grid system 100.

The memory 510, in one embodiment, may store a global client profile 514, a source client profile 516, a target data record 518, a local source log 520, and a local target log 522. The global client profile 514 is substantially similar to the global client profile 414 of the global sequence manager 400 and, in one embodiment, one may be a copy of the other. Likewise, the source client profile 516 is substantially similar to the source client profile 416 of the global sequence manager 400 and, in one embodiment, one may be a copy of the other. Similarly, the target data record 518 is substantially similar to the target data record 420 of the global sequence manager 400 and, in one embodiment, one may be a copy of the other. The local source log 520 and local target log 522 are each similar to the global backup log 424, but are unique to the client 500 in its capacity as either a source client or a target client. In one embodiment, the client 500 and the global sequence manager 400 may be embodied in a single client 104-110, for instance.

The local sequence management apparatus 512 is configured, in one embodiment, to both initiate and facilitate data backup and restore operations over the grid system 100. In one particular embodiment, the client 500 may act as a source client and initiate a backup grid application to back up data files originally stored on the local storage device 504 of the client 500. Under the management of the global sequence manager 400, the local sequence management apparatus 512 may back up local files to one or more remote target clients 104-110 within the grid system 100. Likewise, the client 500 may act as a source client and initiate a restore grid application to restore the backup data packets from the appropriate target clients 104-110. In an alternate embodiment, the client 500 may act as a target client and store backup copies of files, or portions thereof, that are originally stored on remote source clients 104-110. In such a case, the client 500 may use allocated storage 216 within the local storage device 504 to store the backup data.

The illustrated local sequence management apparatus 512 includes a data backup module 524, a data restore module 526, a local profile management module 528, and a unique data identifier generation module 530. In one embodiment, the data backup module 524 is configured to send a data backup request to the global sequence manager 400. In one embodiment, the data backup module 524 may request various types of backup, such as a full or partial backup, including an incremental backup, a differential backup, etc. The backup request may be invoked in response to a user request via the client 500 or an administrator request via a local network or the grid system 100. Alternately, the backup request may be invoked in response to a scheduled event, for example, a weekly incremental backup procedure, or in response to an asynchronous event, such as a storage usage setpoint. Alternatively, the backup request may be invoked in response to a triggered event, such as a particular activity or event occurring on the client 500 or within the grid system 100.

The data restore module 526 is configured, in one embodiment, to send a data restore request to the global sequence manager 400. Similar to the data backup request, the data restore request may be invoked in response to one or more manual or automatic inputs, including user request, storage failure, or a request from a local application program. The local profile management module 528 is similar to the global profile management module 430 of the global sequence management apparatus 412. In one embodiment, the local profile management module 528 creates or stores a unique source client profile 516 specific to the client 500 on which the local profile management module 528 resides. In a further embodiment, the local profile management module 523 may create or store a unique source client profile 516 that is specific to a particular data unit.

The unique data identifier generation module 530 is configured, in one embodiment, to generate a unique data identifier (UDI) for each original (non-backup), unique data unit that may reside on the client 500. For example, the UDI generation module 530 may create and assign a unique data identifier (UDI) to each data file or portion thereof on the client 500. In a further embodiment, the UDI generation module 530 may reside on the global sequence management apparatus 412 and assign a unique data identifier (UDI) for each data packet, which may be a portion of a data file. The unique data identifier (UDI) may be used to determine if a backup copy of a particular data unit, file, packet, or portion thereof has already been backed up on a particular target client or set of target clients. If so, the global sequence management apparatus 412 may conserve storage space available to the grid system 100 by referencing the existing backup copy rather than creating duplicate backup copies of the same data unit, even if original copies of the data unit originated from distinct source clients.

In one embodiment, the local sequence management apparatus 512 and global sequence management apparatus 412 may reside on a single device. For example, a direct-connect client 308, 310 that is not part of a larger local network, may operate both as a client 500 and a global sequence manager 400 as required. In a further embodiment, the client 500 may be configured with the necessary modules to packetize, compress, encrypt, duplicate, and so forth, the data packets prior to sending them to the global storage manager 400. In another embodiment, the modules in the client 500 or the global storage manager 400 may be distributed among several devices in the grid system 100.

FIG. 6 depicts one embodiment of a global client profile 600 that is substantially similar to the global client profiles 414, 514 of FIGS. 4 and 5. In one embodiment, the global client profile 600 may be stored on one or both of the global sequence manager 400 and the client 500. The illustrated global client profile 600 includes a network identifier field 602, a network allocation field 604, a client identifier field 606, a client packet compression field 608, a client packet redundancy field 610, a client packet encryption field 612, a client backup proximity field 614, a client packet proximity field 616, a client storage field 618, a client processor field 620, a client bandwidth field 622, a client synchronization field 624, and a client auto archive field 626.

The network identifier field 602, in one embodiment, may be configured to store a network identifier for a particular network system, for example, the network system 304 of FIG. 3, within the grid system 300. The network allocation field 604, in one embodiment, may store a network allocation parameter that indicates the network performance resources that are dedicated to the grid system 300. For example, the network allocation field 604 may store a network bandwidth allocation parameter that indicates a percentage of the network bandwidth that is dedicated to the grid system 300 and available for backup grid applications.

The client identifier field 606, in one embodiment, may be configured to store a client identification parameter, such as a client name or number. In one embodiment, each client 500 connected to a grid system 100 may be identified by a unique client name. In a further embodiment, the client identification parameter stored in the client identifier field 606 may incorporate the network identification parameter stored in the network identifier field 602.

In one embodiment, the client backup proximity parameter 614 may indicate a geographical limitation, such as a minimum or maximum distance, between the source client and the target clients on which the backup data is stored. In another embodiment, the client packet proximity parameter 616 may indicate a minimum or maximum distance between several target clients on which the backup data is stored. In this way, the client backup parameters 614 and packet proximity parameters 616 ensure that the accessibility of one packet may be substantially independent of the accessibility of a disparate data packet. For example, a source client may request that backup data be stored in target clients that are not in the same metropolitan area, state, or even nation as the source client by adjusting the client backup proximity parameter 614 accordingly.

The client backup parameters 614 and packet proximity parameters 616 may indicate, in one embodiment, a physical distance, such as miles or kilometers. The distance between nodes 104-110 may be calculated or estimated, for instance, using global positioning system (GPS) coordinates. In an alternative embodiment, the client backup parameters 614 and packet proximity parameters 616 may indicate a logical distance. For example, the client backup parameters 614 and packet proximity parameters 616 may reference the internet protocol (IP) address of the source client and specify that the backup packets be stored on target clients within a different network or subnet. In a further embodiment, the client backup parameters 614 and packet proximity parameters 616 may inclusively or exclusively specify certain nodes 104-110 on which to store or not to store the backup data packets.

The client packet compression field 608, client packet redundancy field 610, and client packet encryption field 612 may be configured to store default compression, redundancy, and encryption parameters, respectively. These parameters may indicate a type of compression, level of encryption, or level of redundancy, for example, that may be used as a default parameter. Similarly, the client backup proximity field 614 and client packet proximity field 616 may be configured to store default proximity parameters.

The client storage field 618, in one embodiment, may be configured to store a default client storage allocation parameter that defines a default amount of client storage dedicated to the grid system 100. Likewise, the client processor field 620 and client bandwidth field 622, in one embodiment, may indicate the amount of processor capability and bandwidth, respectively, that is dedicated to the grid system 100. In one embodiment, each of these parameters may be indicated by a quantitative number. In another embodiment, each of these parameters may be expressed as a percentage of the total capacity available.

The client synchronization field 624, in one embodiment, may be configured to store a client synchronization parameter that indicates how often the global client profile 600 on the global sequence manager 400 should be synchronized with the global client profile 514 or the source client profile 516 on the client 500. This synchronization may be a single step process, in one embodiment, or alternately may include additional steps to synchronize the global client profile 514 on the client 500 and the source client profile 416 on the global sequence manager 400. Preferably, if multiple copies of the global client profile 600 exist on both the client 500 and the global sequence manager 400, these copies will be synchronized as often as may be necessary to provide accurate information to both the client 500 and the global sequence manager 400.

The client auto archive field 626 is configured, in one embodiment, to store a client auto archive parameter that indicates how often the client data files should be backed up. In a further embodiment, the client auto archive parameter may indicate the type of backup, whether full or incremental or another type of backup, to be performed in response to a given stimulus.

FIG. 7 depicts one embodiment of a source client profile 700 that is substantially similar to the source client profiles 416, 516 of FIGS. 4 and 5. In one embodiment, the source client profile 700 may be stored on one or both of the global sequence manager 400 and the client 500. The illustrated source client profile 700 includes a source client identifier field 702, a unique data identifier (UDI) field 704, a data source location field 706, a data packet compression field 708, a data packet redundancy field 710, a data packet encryption field 712, a data backup proximity field 714, a data packet proximity field 716, a data synchronization field 718, and a data sequence key field 720.

The source client identifier field 702, in one embodiment, is substantially similar to the client identifier field 606 of the global client profile 600. The unique data identifier (UDI) field 704 may be configured, in one embodiment, to store a unique data identifier (UDI) that corresponds to a specific data unit. The data source location field 706, in one embodiment, may be configured to identify the file location of the original data unit, identified by the unique data identifier (UDI) stored in the UDI field 704, on the source client.

The data packet compression field 708, data packet redundancy field 710, and data packet encryption field 712 are similar to the client packet compression field 608, client packet redundancy field 610, and client packet encryption field 612 of the global client profile 600. However, in one embodiment, these fields 708, 710, 712 in the source client profile 700 may store actual parameters for each data unit identified by a unique data identifier (UDI), rather than default parameters for all of the data units on a particular source client. Alternately, these fields 708, 710, 712 may store the same parameters for all data units and may store the same parameters as the respective fields 608, 610, 612 in the global client profile 600. Similarly, the data backup proximity field 714 and data packet proximity field 716 are similar to the proximity fields 614, 616 of the global client profile 600. However, these fields 714, 716 in the source client profile 700 may store user-defined parameters specific for each data unit, similar to the fields 708, 710, 712 described above.

Preferably, if multiple copies of the source client profile 700 exist on both the client 500 and the global sequence manager 400, these copies will be synchronized as often as may be necessary to provide accurate information to both the client 500 and the global sequence manager 400. The data synchronization field 718 may be configured, in one embodiment, to store a client synchronization parameter that indicates how often the source client profile 416 on the global sequence manager 400 should be synchronized with the source client profile 516 on the client 500. The data synchronization field 718 and parameter may be similar to the client synchronization field 624 and parameter of the global client profile 600. Where applicable, the source client profile 700 also may be synchronized with at least a portion of the global client profile 600.

The data sequence key field 720, in one embodiment, is configured to store the non-transparent sequence key for a specific data unit. As mentioned above, the sequence key may be generated by the sequence module 428 of the global sequence management apparatus 412. In an alternative embodiment, the data sequence key field 720 may store a generation stimulus key, rather than the actual sequence key. In this way, the actual sequence key may be stored only on the global sequence manager 400 and not on the client 500. In a further embodiment, the non-transparent sequence key may not be stored anywhere in the grid system 100, but rather may be generated by the sequence module 428 using the generation stimulus key each time it is needed by using at least the generation stimulation key. The sequence module 428 also may use the unique data identifier (UDI), data source location parameter, source client identifier parameter or one or more other parameters, in conjunction with the generation stimulus key, in order to generate the sequence key as needed.

FIG. 8 depicts one embodiment of a source data record 800 that is substantially similar to the source data record 418 of FIG. 4. In one embodiment, the source data record 800 is stored exclusively on the global sequence manager 400. The illustrated source data record 800 includes a unique data identifier (UDI) field 802, a packet identifier field 804 and one or more target identifier fields 806-810. In one embodiment, the source data record 800 identifies the various target clients on which each backup data packet is stored.

The UDI field 802 is configured, in one embodiment, to store the unique data identifier (UDI) of the backup data file. The packet identifier field 804 is configured, in one embodiment, to store the packet identifier for a particular data packet that belongs to the backup data file. The target identifier fields 806-810 are configured, in one embodiment, to each store a target identifier corresponding to a target client on which a copy of the backup data packet has been stored. Multiple target identifiers 806-810 may be appended to the source data record 800 depending on how many target clients may store a copy of the same data packet. In an alternate embodiment, the unique data identifier (UDI) may identify a specific data packet rather than the entire backup data file. In this case, the source data record 800 may use equivalent means to indicate the original file, the data packets, and the location of each backup copy of the data packets.

FIG. 9 depicts one embodiment of a target data record 900 that is substantially similar to the target data records 420, 518 of FIGS. 4 and 5. In one embodiment, the target data record 900 may be stored on one or both of the global sequence manager 400 and the client 500. The illustrated target data record 900 includes a unique data identifier (UDI) field 902, a packet identifier field 904, a packet size field 906, and a target location field 908.

The UDI field 902 is configured, in one embodiment, to store the unique data identifier (UDI) of the backup data file. The packet identifier field 904 is configured, in one embodiment, to store a packet identifier for a particular data packet that belongs to the backup data file. The packet size field 906 is configured, in one embodiment, to store a packet size parameter to indicate the size of the packet. The target location field 908 is configured, in one embodiment, to indicate the storage location on the target client where the backup data packet is stored. In this way, the target data record 900 may facilitate the recovery of a requested backup data packet for a source client during a restore operation. In an alternative embodiment, the unique data identifier (UDI) may identify a specific data packet rather than the entire backup data file. In this case, the target data record 900 may use equivalent means to indicate the original file, the data packets, the size of the packet, and the location of the backup copy on the target client.

Figure 10:
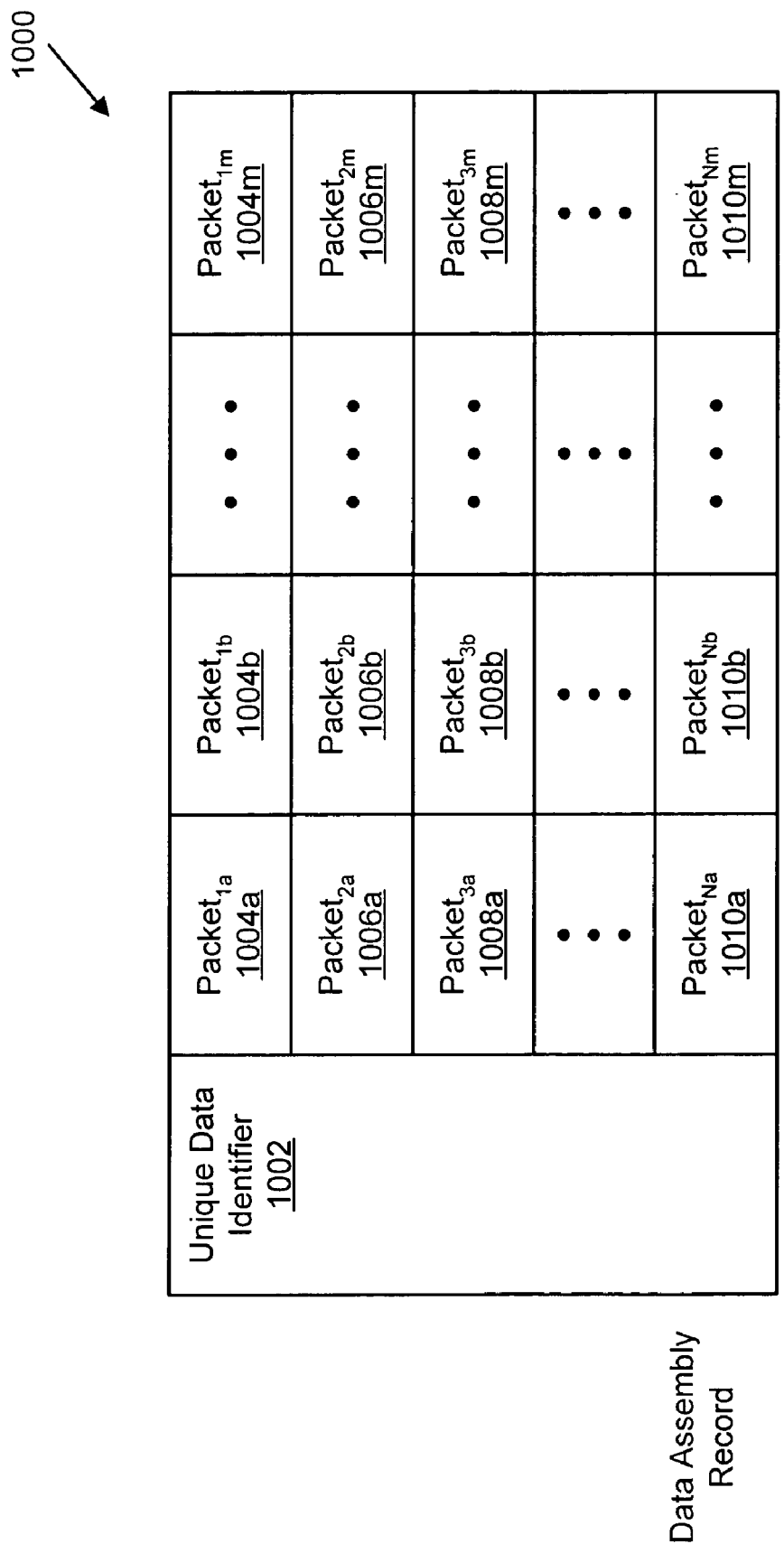
FIG. 10 is a schematic block diagram illustrating one embodiment of a data assembly record in accordance with the present invention.

FIG. 10 depicts one embodiment of a data assembly record 1000 that is substantially similar to the data assembly record 422 of FIG. 4. In one embodiment, the data assembly record 1000 is stored exclusively the global sequence manager 400. The data assembly record 1000 includes a unique data identifier (UDI) field 1002 and a table of one or more packet fields 1004*a-m* through 1010*a-m*.

The UDI field 1002 is configured, in one embodiment, to store the unique data identifier (UDI) of the backup data file. The packet identifier fields 1004*a-m* are configured, in one embodiment, to store the packet identifiers for the duplicate copies of the first data packet that belongs to the backup data file. Likewise, the packet identifier fields 1006*a-m* are configured, in one embodiment, to store the packet identifiers for the copies of the second data packet that belongs to the backup data file. Similarly, the packet identifier fields 1008*a-m* are configured, in one embodiment, to store the packet identifiers for the copies of the third data packet that belongs to the backup data file. This pattern continues through to the packet identifier fields 1010*a-m*, which store the packet identifiers for the copies of the last data packet that belongs to the backup data file. In an alternate embodiment, the unique data identifier (UDI) may identify a specific data packet rather than the entire backup data file. In this case, the data assembly record 1000 may use equivalent means to indicate the original file and the assembly order of the data packets.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect. Additionally, the format and symbology employed are provided to explain the logical steps of the process and are understood not to limit the scope of the process. Likewise, although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process.

Figure 11:
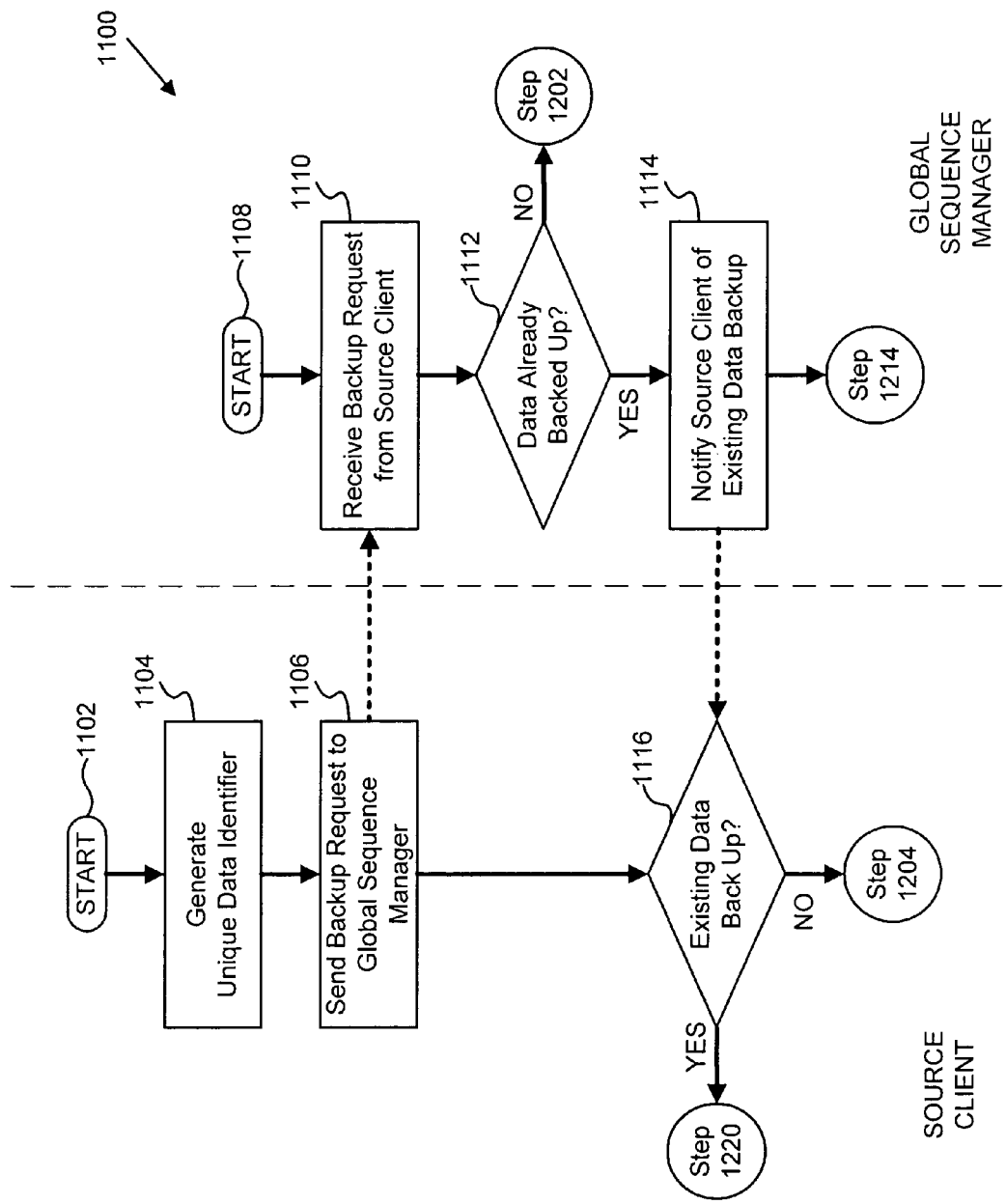
FIGS. 11-12 are a schematic flow chart diagram illustrating one embodiment of a backup method in accordance with the present invention.
Figure 12:
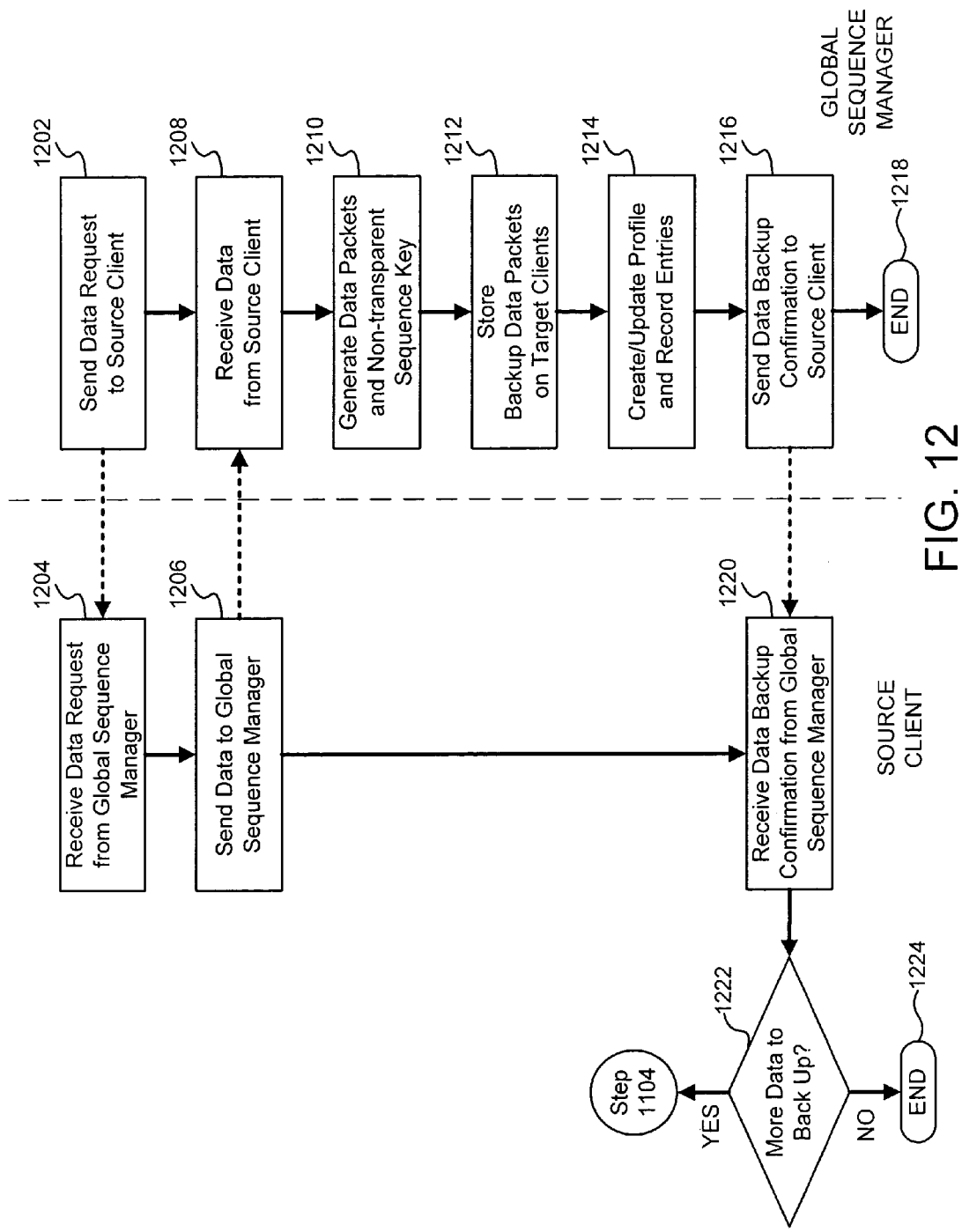
Figure 13:
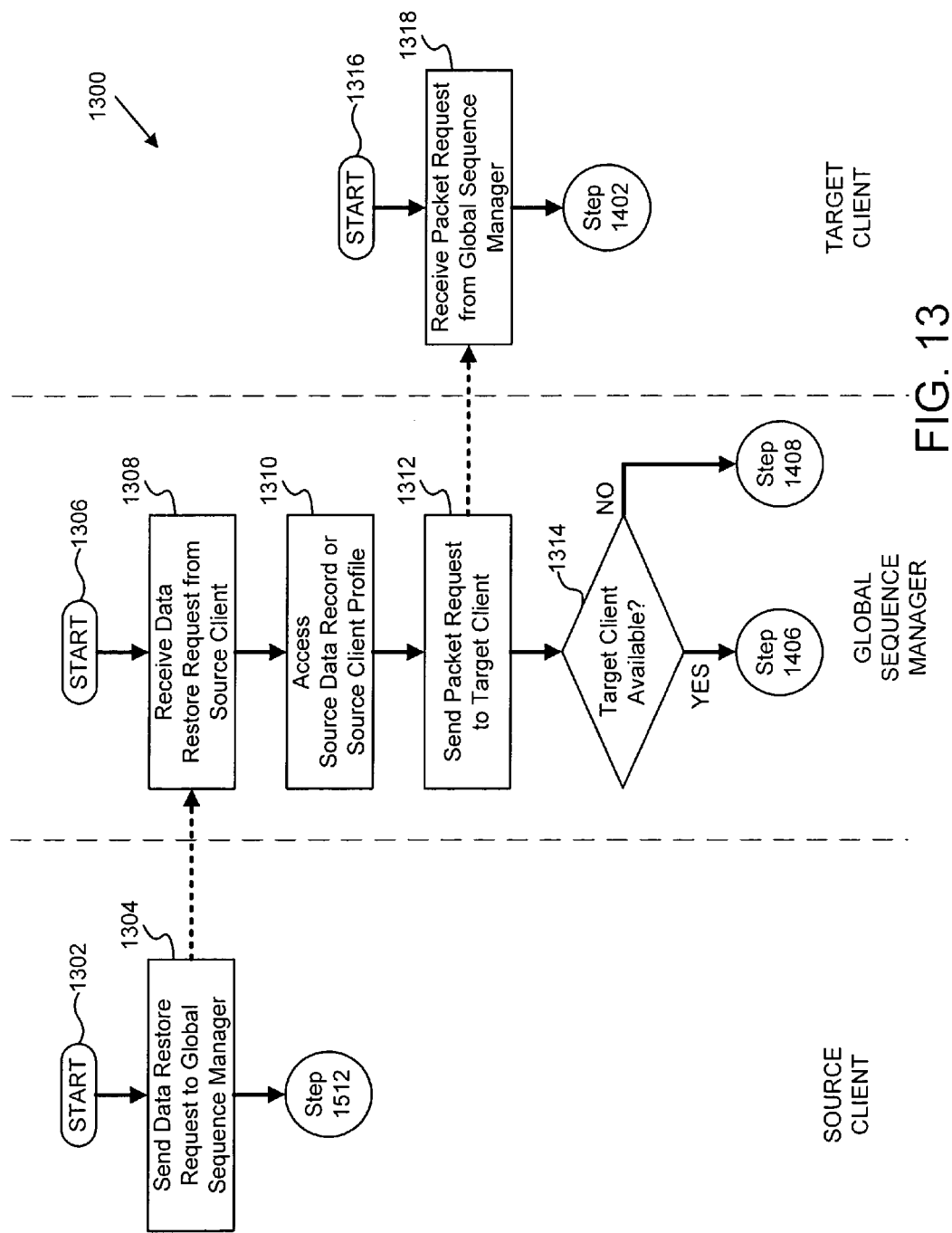
FIGS. 13-16 are a schematic flow chart diagram illustrating one embodiment of a restore method in accordance with the present invention.
Figure 14:
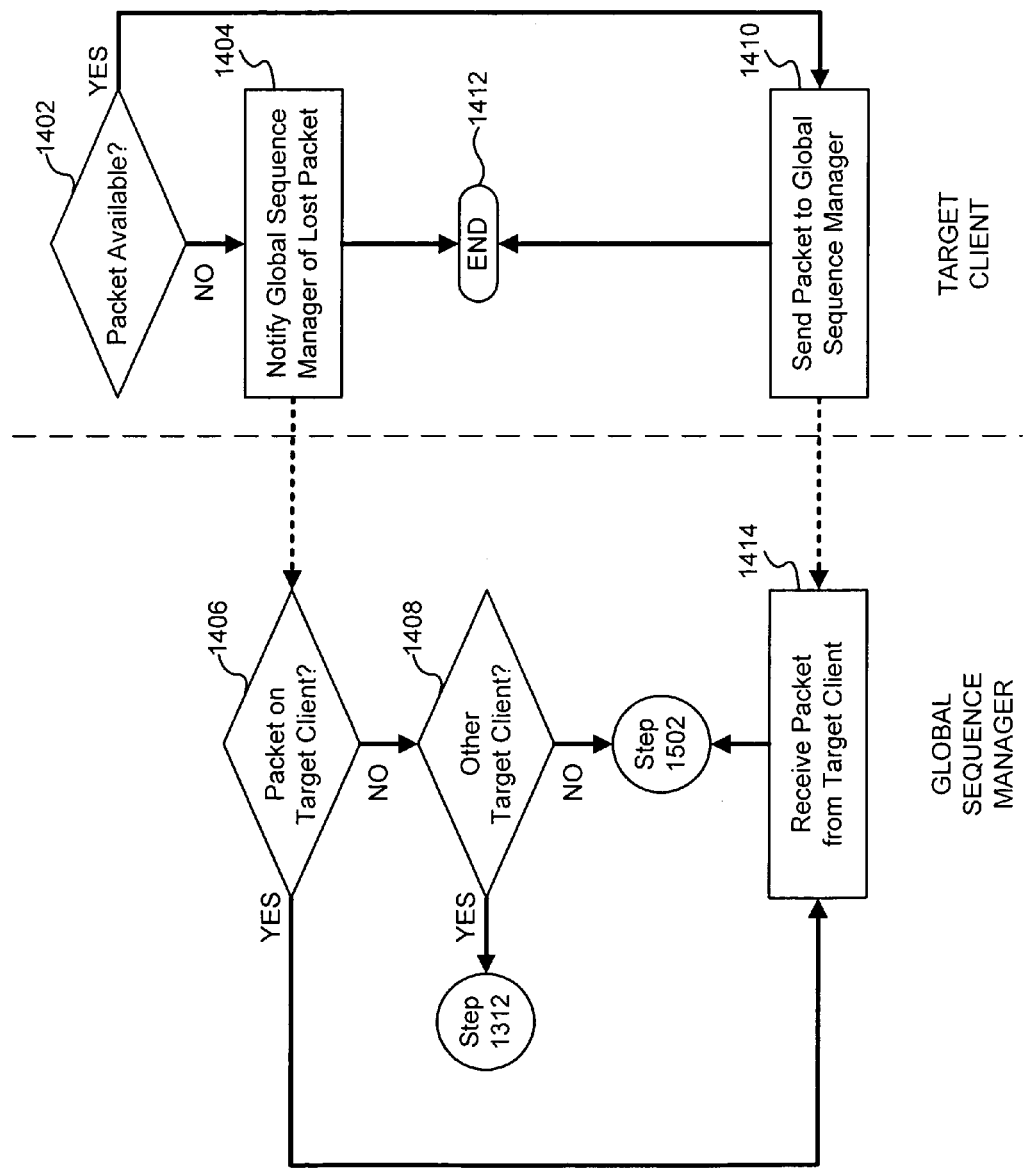
Figure 15:
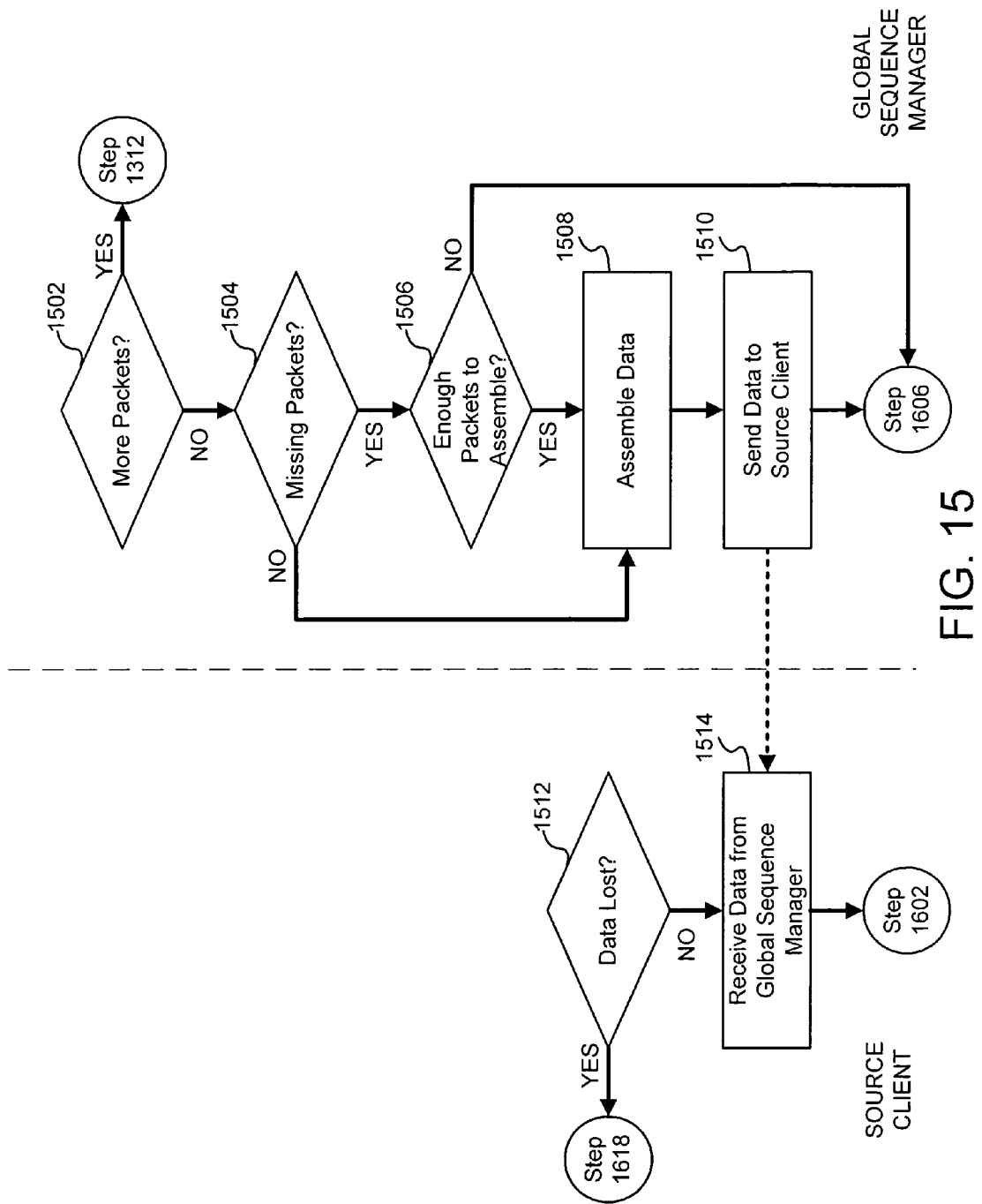
Figure 16:
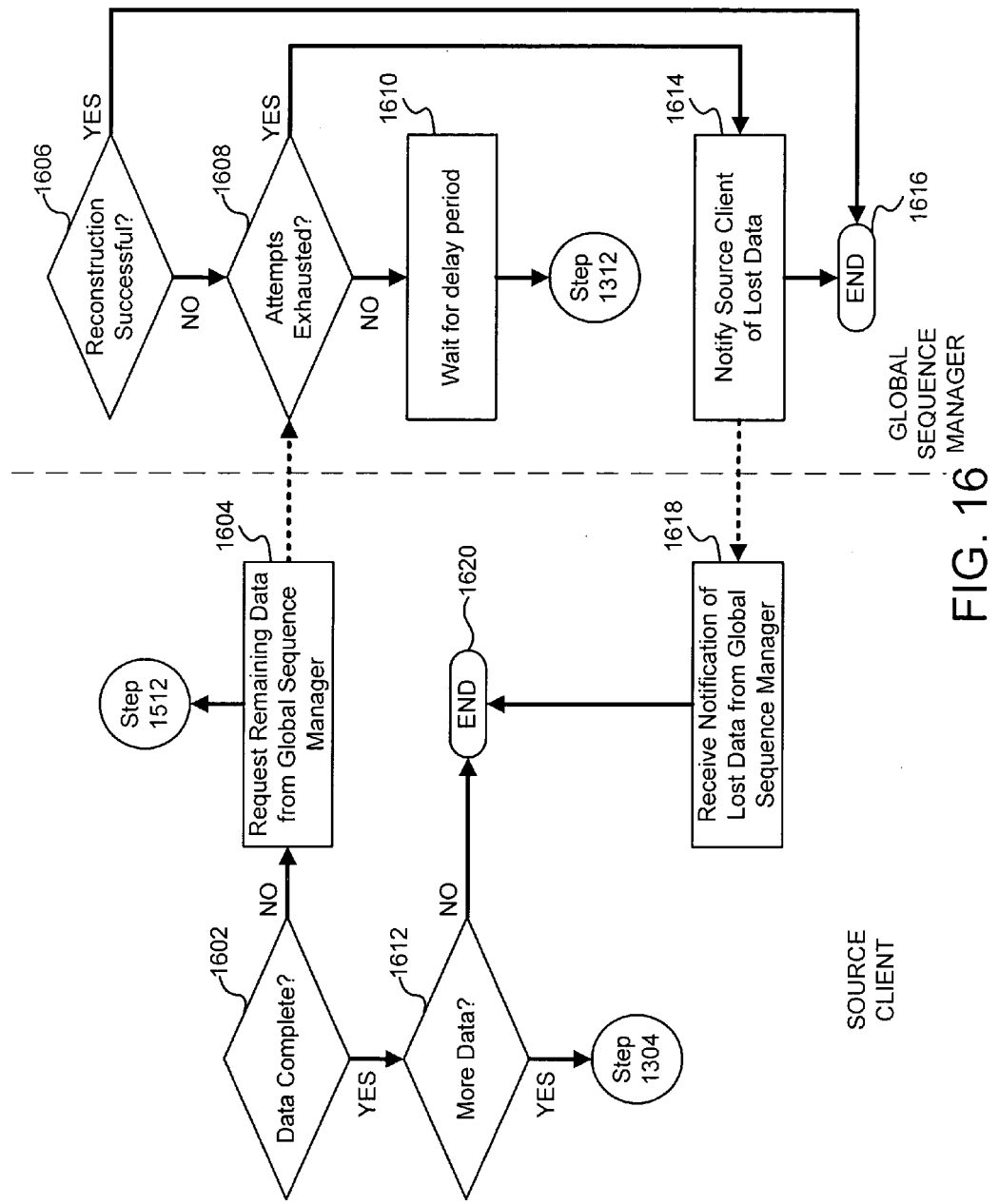

FIGS. 11-12 depict one embodiment of a backup method 1100 that may be employed to back up data on the grid system 100. The illustrated backup method 1100 is divided into as many as three divisions. Each division represents a subprocess that may occur on a particular component of the grid system 100. However, although the backup process 1100 is divided into three subprocesses and labeled as occurring on a particular component, this illustration is not meant to limit the subprocess to a particular component. In fact, many of the depicted steps in the backup process 1100 may occur on or be performed by various components within the grid system 100. Additionally, not all of the steps of a single subprocess must be executed by a single component. Likewise, a single component may execute various steps from disparate subprocesses.

The illustrated backup method 1100 begins 1102 by generating 1104 a unique data identifier (UDI) for the data unit to be backed up. The source client subsequently sends 1106 a backup request to the global sequence manager. The global sequence manager 400 then receives 1110 the backup request from the source client. In one embodiment, the backup request includes the unique data identifier (UDI) of the data unit to be backed up. Alternately, the unique data identifier (UDI) may be transmitted separately.

Using the unique data identifier (UDI) The global sequence manager 400 determines 1112 if a backup copy of the data unit already exists within the grid system 100. If a backup copy of the data corresponding to the unique data identifier (UDI) does not already exist, the global sequence manager 400 sends 1202 a data request to the source client requesting a copy of the data unit to be backed up. The source client receives 1204 the data request and subsequently sends 1206 a copy of the data unit to the global sequence manager 400. In the depicted embodiment, the global sequence manager 400 then receives 1208 the data unit from the source client, subdivides 1210 the data unit into the necessary number of data packets, and generates 1210 a unique, non-transparent sequence key for the data unit.

The global sequence manager 400 then stores 1212 the backup data packets on the target clients according to the non-transparent sequence key. For each data unit, or portion thereof, the global sequence manager 400 may create or modify 1214 the appropriate profiles 600, 700 and records 800, 900, 1000 associated with the client 500 and data unit. The global sequence manager 400 then sends 1216 a data backup confirmation to the source client, indicating that the backup operation has been successfully completed. The source client, upon receiving 1220 the data backup confirmation from the global sequence manager 400, determines 1222 if more data units need to be backed up. If so, the illustrated backup method 1100 returns to generate 1104 a new unique data identifier (UDI) for the next data unit. Otherwise, the depicted backup method 1100 ends.

Alternately, if the global sequence manager 400 determines 1112 that a backup copy of the data unit already exists on the grid system 100, the global sequence manager 400 then notifies 1114 the source client of the existing backup. The depicted backup method 1100 then continues as described above. In a further embodiment, the global sequence manager 400 may create or modify 1214 the appropriate profiles 600, 700 or records 800, 900, 1000 prior to notifying 1114 the source client of the existing backup.

FIGS. 13-16 depict one embodiment of a restore method 1300 that may be employed to restore data on the grid system 100. The illustrated restore method 1300 is divided into as many as three divisions. Each division represents a subprocess that may occur on a particular component of the grid system 100. However, although the restore process 1300 is divided into three subprocesses and labeled as occurring on a particular component, this illustration is not meant to limit the subprocess to a particular component. In fact, many of the depicted steps in the restore process 1300 may occur on or be performed by various components within the grid system 100. Additionally, not all of the steps of a single subprocess must be executed by a single component. Likewise, a single component may execute various steps from disparate subprocesses.

The illustrated restore method 1300 begins 1302 when the source client sends 1304 a data restore request to the global sequence manager 400. In one embodiment, the restore request includes the unique data identifier (UDI) of the backup data unit to be restored. Alternately, the unique data identifier (UDI) may be transmitted separately. The global sequence manager 400, upon receiving 1308 the data restore request, may access 1310 the corresponding source data record 800 to determine which target clients are storing backup data packets of the requested data unit. In an alternative embodiment, the global sequence manager 400 may access 1310 the corresponding source client profile 700 and regenerate the sequence key to determine which target clients are storing backup data packets of the requested data unit.

The global sequence manager 400 then sends 1312 a packet request to the appropriate target clients. As discussed above, duplicate copies of each data packet may be stored on one or more target clients. In the depicted embodiment, each target client receives 1318 the packet request from the global sequence manager 400. Given that the grid system 100 may comprise several independently administered networks and clients, some of the target clients may be offline and otherwise unavailable at the time of the request. If a target client is available at the time of the request, the target client determines 1402 if the requested packet is available. Some of the available target clients may have reclaimed storage space that was previously used as a grid resource, thereby destroying or making a copy of the backup data packet otherwise unavailable to the grid system 100.

If the available target client determines 1402 that the requested packet is not available, the target client notifies 1404 the global sequence manager 400 of the lost packet. In response to a lost packet, the global sequence manager 400 may determine 1408 if another target client having a copy of the requested data packet is available. If another target client is available, the global sequence manager 400 may send 1312 a packet request to the available target client and the depicted restore method 1300 continues as described above. If the available target client determines 1402 that the requested packet is available, the target client sends 1410 the requested packet to the global sequence manger 400. The global sequence manager 400 then receives 1414 the requested packet from the available target client.

Whether a particular data packet is available or not, the global sequence manager 400 determines 1502 if additional data packets are needed and available for the requested data unit. If more packets are needed, the global sequence manager 400 sends 1312 the necessary packet requests to the corresponding target clients. The illustrated restore method 1300 then continues as described above.

Once all of the data packets have been requested and received, if available, from the target clients, the global sequence manager may determine 1504 if any of the requested data packets are missing, lost, corrupted, or otherwise unavailable. In one embodiment, the global sequence manager 400 may refer to the client packet redundancy and data packet redundancy parameters stored in the profiles 600, 700 to access redundant copies of the missing packets.

The global sequence manager 400 then determines 1506 if a sufficient number of packets have been retrieved to assemble all or part of the original data. If enough packets are available, the global sequence manager 400 assembles 1508 the data, in one embodiment using the data assembly record 1000, and sends 1510 the data to the source client. The source client then receives 1514 the partially or fully assembled data from the global sequence manager 400.

If some of the data is lost or otherwise unavailable during the backup and restore operations, the source client determines 1602 if the data is completely or sufficiently reconstructed. If the data is sufficiently reconstructed, the source client determines 1612 if additional data units need to be restored and, if so, returns to sends 1304 a subsequent data restore request to the global sequence manager 400. The depicted restore method 1300 then continues as described above.

If the source client determines 1602 that the requested data is not sufficiently reconstructed, the source client repetitively requests 1604 the remaining data packets from the global sequence manager 400. The global sequence manager 400 determines 1608 if all restoration attempts have been exhausted and, if not, may wait 1610 for a predetermined delay period before sending 1312 a subsequent packet request to a target client. Alternately, the global sequence manager may wait 1610 for a random delay period rather than a predetermined delay period. For example, in one embodiment, the global sequence manager 400 may wait for 24 hours. In another embodiment, the global sequence manager 400 may wait until the start of the next business day before sending 1312 a subsequent packet request. A previously unavailable target client may become available to the grid system 100 within this delay time.

The illustrated restore method 1300 then continues as described above until the requested data unit is complete or until all of the restoration attempts are exhausted. If all of the data restoration attempts are exhausted and the data is not complete, the global sequence manager 400 may notify 1614 the source client of the lost data and the exhausted attempts. The source client receives 1618 the notification of the lost data from the global sequence manager 400 and the depicted restore method 1300 then ends 1620.

In conjunction with the backup method 1100 and restore method 1300 discussed above, the grid system 100 may include components necessary to administer a client subscription program that allows clients 104-110 to pay for access to the backup and restore functionality of the grid system 100. In one embodiment, the subscription manager 312 of FIG. 3 may be configured to manage this type of client subscription system. The client subscription system may allow numerous source and target clients. The subscription fees for each of the clients may be dependent on the amount of data to be stored, the reliability and accessibility of the backup required by the source client, the amount of local client performance resources dedicated to the grid system, as well as the consistency of allocated resources over time. Other factors impacting the performance of the grid system 100 also may be used to determine the fee for a particular client 104-110.

With further regard to the subscription manager 312, the subscription manger 312, in one embodiment, is an apparatus for managing the information collected, used, or generated in the process of determining user fees, controlling the level of service, controlling the use of the service, controlling the contribution of performance resources, etc. to or for a grid application, from or to a customer, business, etc.

In one embodiment, the subscription manager 312 may serve at least two purposes. First, it may determine the user fees to be charged to a user based on usage of the grid resources by the user and/or contribution of performance resources by the user to the grid. Second, the subscription manager 312 may control the access, use, level of use, and so forth, to the grid system 100 and grid resources. The subscription manager 312 also may control the allocation, level of contribution, and so forth, of client performance resources to the grid system 100 based on autonomic policies described herein.

In order to manage the subscriptions of various clients 400 to the grid system 100, the subscription manager 312 may create and store a client profile, a global profile, and a customer profile. In one embodiment, the global profile of the subscription manager 312 may contain information regarding performance resource allocation and usage in order to determine the user fee for a specific customer. In one embodiment, the global profile of the subscription manager 312 may be generic to all performance resources and clients 400 using the grid system 100.

In one embodiment, the customer profile contains information that relates the global profile to the particular customer. The customer profile may aggregate information about a particular customer, including information about client performance resource allocation and locally invoked grid applications. The customer profile may be used to determine the overall fee that a customer is charged. Similarly, in one embodiment, the client profile in the subscription manger 312 may contain similar information that corresponds to a specific client 400.

In one embodiment, the subscription manager 312 determines user fees based on one or more of the instantaneous, average, maximum, minimum, planned, reserved, peak, and so forth, use of the grid system 100 by client 400 for a grid application. In another embodiment, the subscription manager 312 may track the allocation of client performance resources to the grid system 100 by a client 400. The subscription manager 312 may track one or more of the instantaneous, average, maximum, minimum, planned, reserved, peak, and so forth, level contributed. In a further embodiment, the subscription manager 312 track a combination of one or more of the factors listed above.

In another embodiment, the subscription manager 312 may monitor and control the execution of an autonomic policy by a global autonomic manager 300 or the client 400. For example, a business may subscribe to a grid system 100 for a backup retrieve grid application. To keep costs down, the business may decide to contribute performance resources to the grid system 100 from each of the connected clients 400. If a user decides to reclaim the allocated performance resources of a particular client and reduce his contribution to zero, the subscription manager 312 may alter the client profile and customer profile to determine the appropriate fee. According to the global profile of the subscription manager 312, the global autonomic manager 300 of the grid system 100 may maintain upper and lower thresholds for performance resource allocation, thereby preventing such a reclamation of all allocated resources.

In another embodiment, the subscription manager 312 may control a policy change requested by a client 400 or by a global autonomic manger 300. The customer profile of the subscription manager 312 may prevent certain changes to the resource allocation or to the grid application usage of the client 400. For example, the client profile may have a limit on the total cost that a customer may occur in a predetermined billing period. The subscription manager 312 may block certain uses by a client 400 if these limits are exceeded.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sequence management apparatus for backing up data across a plurality of clients, the apparatus comprising:
   a storage device storing executable code;
   a processor executing the executable code, the executable code comprising
   a client request module receiving data to be backed up from a source client, the data comprising a plurality of backup data packets;
   a sequence module generating a non-transparent sequence comprising packet identifiers for each of the plurality of backup data packets arranged in an order that the plurality of backup data packets are stored from the source client to a plurality of target clients, wherein the non-transparent sequence is unique and exclusively accessible to the sequence management apparatus;
   a packet storage module storing the data on the plurality of target clients according to the non-transparent sequence, wherein the source client and the plurality of target clients are organized in a grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers;
   a packet retrieval module retrieving the plurality of backup data packets backed up on the plurality of target clients; and
   a data assembly module assembling the retrieved plurality of backup data packets in the non-transparent sequence of the packet identifiers.

2. The apparatus of claim 1, the executable code further comprising a global profile management module managing a metadata file, the metadata file descriptive of the data backed up on the plurality of target clients.

3. The apparatus of claim 2, wherein the metadata file is selected from the group consisting of a global client profile, a source client profile, a source data record, a target data record, a data assembly record, and a global backup log.

4. The apparatus of claim 2, the global profile management module further using a unique data identifier corresponding to the data to map the data to the source client, the unique data identifier identifying original, non-backup data and indicating a uniqueness of the data as compared to other data.

5. The apparatus of claim 4, the packet storage module creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

6. The apparatus of claim 5, the global profile management module further mapping the unique data identifier to a second source client on which an identical copy of the data is stored.

7. The apparatus of claim 1, the packet retrieval module further retrieving the at least a portion of the data backed up on one of the plurality of the target clients according to the non-transparent sequence generated by the sequence module.

8. The apparatus of claim 1, the packet storage module further separating the data into the plurality of backup data packets.

9. The apparatus of claim 8, the executable code further comprising a compression module compressing the data within the backup data packets prior to storing the backup data packets on the plurality of target clients.

10. The apparatus of claim 8, the executable code further comprising an encryption module encrypting the data within the backup data packets prior to storing the backup data packets on the plurality of target clients.

11. The apparatus of claim 8, the executable code further comprising a redundancy module creating a redundant backup data packet of at least one of the backup data packets prior to storing the backup data packets on the plurality of target clients.

12. The apparatus of claim 11, the packet storage module further storing the redundant backup data packet on one of the plurality of target clients according to the non-transparent sequence.

13. A client for backing up data across a plurality of target clients in conjunction with a sequence management apparatus, the client comprising:
   a network interface communicating with the sequence management apparatus;
   a storage defining an allocated storage; and
   a storage device storing executable code;

a processor executing the executable code, the executable code comprising a client backup manager apparatus managing a backup operation backing up data comprising a plurality of backup data packets from a source client across a grid computing system to the plurality of target clients using a unique data identifier and a non-transparent sequence, wherein the non-transparent sequence comprises packet identifiers for each of the plurality of backup data packets arranged in an order that the plurality of backup data packets are stored on the plurality of target clients and the non-transparent sequence is unique and exclusively accessible to the sequence management apparatus and the unique data identifier identifies original, non-backup data, wherein the plurality of target clients are organized in the grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers, the client backup manager further retrieving the plurality of backup data packets backed up on the plurality of clients and assembling the retrieved plurality of backup data packets in the non-transparent sequence of the packet identifiers.

14. The client of claim 13, wherein the source client initiates the backup operation and generates the unique data identifier for the data.

15. The client of claim 14, wherein the client backup manager further maps the data to source client using the unique data identifier corresponding to the data, the unique data identifier identifying original, non-backup data and indicating a uniqueness of the data as compared to other data, and the client backup manager further creates a redundant backup data packet for each backup data packet prior to storing the backup data packets on the plurality of target clients and stores the redundant backup data packet on one of the plurality of target clients according to the non-transparent sequence.

16. The client of claim 14, the client backup manager apparatus creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

17. A system for backing up data across a plurality of clients, the system comprising:

a network communications channel;

a source client connected to the network communications channel and initiating a data backup operation for data comprising a plurality of backup data packets;

a plurality of target clients connected to the network communications channel;

a storage device storing executable code;

a processor executing the executable code, the executable code comprising a global sequence manager connected to the network communications channel and storing the data from the source client to the plurality of target clients according to a non-transparent sequence comprising packet identifiers for each of the plurality of backup data packets arranged in an order that the plurality of backup data packets are stored on the plurality of target clients, wherein the non-transparent sequence is unique and exclusively accessible to the global sequence manager and the source client and the plurality of target clients are organized in a grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers, the global sequence manager further retrieving the plurality of backup data packets backed up on the plurality of target clients and assembling the retrieved plurality of backup data packets in the non-transparent sequence of the packet identifiers.

18. The system of claim 17, the global sequence manager further storing a single copy of the data corresponding to a unique data identifier and mapping the single copy of the data to the source client on which the data is stored and to a second source client on which an identical copy of the data is stored, the unique data identifier identifying original, non-backup data and indicating a uniqueness of the data as compared to other data.

19. The system of claim 18, the global sequence manager creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

20. The system of claim 17, the global sequence manager and subscription manager further tracking a source storage allocation parameter of the source client.

21. The system of claim 17, the global sequence manager and subscription manager further tracking a target storage allocation parameter of each of the plurality of target clients.

22. The system of claim 17, the global sequence manager and subscription manager tracking a resource allocation parameter.

23. The system of claim 22, wherein the resource allocation parameter is selected from the group consisting of a network allocation parameter, a client processor parameter, and a client bandwidth parameter.

24. The system of claim 17, wherein the global sequence manager further creates a redundant backup data packet for each backup data packets prior to storing the backup data packets on the plurality of target clients and stores the redundant backup data packet on one of the plurality of target clients according to the non-transparent sequence.

25. A method for backing up data across a plurality of target clients, the method comprising:
receiving, by use of a processor, data to be backed up from a source client, the data comprising a plurality of backup data packets;
generating a non-transparent sequence comprising packet identifiers for each of the plurality of backup data packets arranged in an order that the plurality of backup data packets are stored from the source client to the plurality of target clients, wherein the non-transparent sequence is unique and exclusively accessible to a global sequence manager;
storing the data on the plurality of target clients according to the non-transparent sequence, wherein the source client and the plurality of target clients are organized in a grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers;
retrieving the plurality of backup data packets backed up on the plurality of target clients; and
assembling the retrieved plurality of backup data packets in the non-transparent sequence of the packet identifiers.

26. The method of claim 25, further comprising managing a metadata file descriptive of the data backed up on the plurality of target clients, the metadata file comprising one of a global client profile, a source client profile, a source data record, a target data record, a data assembly record, and a global backup log.

27. The method of claim 25, further comprising separating the data into the plurality of backup data packets.

28. The method of claim 25, further comprising using a unique data identifier corresponding to the data to map the data to the source client, the unique data identifier identifying original, non-backup data and indicating a uniqueness of the data as compared to other data.

29. The method of claim 28, further comprising creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

30. The method of claim 25, further comprising tracking a resource allocation parameter, wherein the resource allocation parameter is one of a source storage allocation parameter, a target storage allocation parameter, a network allocation parameter, a client processor parameter, and a client bandwidth parameter.

31. The method of claim 25, the method further comprising creating a redundant backup data packet for each backup data packets prior to storing the backup data packets on the plurality of target clients and storing the redundant backup data packet on one of the plurality of target clients according to the non-transparent sequence.

32. A method for backing up data across a plurality of clients, the method comprising:
requesting, by use of a processor, data to be backed up from a source client;
receiving data to be backed up from a source client;
separating the data into a plurality of backup data packets;
generating a non-transparent sequence, comprising packet identifiers for each of the plurality of backup data packets arranged in an order that the plurality of backup data packets are stored from the source client to the plurality of target clients, wherein the non-transparent sequence is unique and exclusively accessible to a global sequence manager;
storing the backup data packets on the plurality of target clients according to the non-transparent sequence, wherein the source client and the plurality of target clients are organized in a grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers;
using a unique data identifier corresponding to the data to map the data to the source client;
managing a metadata file descriptive of the data backed up on the plurality of target clients;

tracking a resource allocation parameter, wherein the resource allocation parameter is one of a source storage allocation parameter, a target storage allocation parameter, a network allocation parameter, a client processor parameter, and a client bandwidth parameter;

managing a contractual subscription of the source client and the plurality of target clients;

retrieving the plurality of backup data packets backed up on the plurality of target clients; and assembling the retrieved plurality of backup data packets in the non-transparent sequence of the packet identifiers.

33. The method of claim 32, the method further comprising:

mapping the data to source client using the unique data identifier corresponding to the data, the unique data identifier identifying original, non-backup data and indicating a uniqueness of the data as compared to other data; and creating a redundant backup data packet for each backup data packets prior to storing the backup data packets on the plurality of target clients and storing the redundant backup data packet on one of the plurality of target clients according to the non-transparent sequence.

34. The method of claim 32, further comprising creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

35. An apparatus for backing up data across a plurality of clients, the apparatus comprising:

a storage device storing executable code;

a processor executing the executable code, the executable code comprising means for receiving data to be backed up from a source client, the data comprising a plurality of backup data packets mapped to the source client with a unique data identifier;

means for generating a non-transparent sequence comprising packet identifiers for each of the plurality of backup data packets arranged in an order that the plurality of backup data packets are stored from the source client to the plurality of target clients, wherein the non-transparent sequence is unique and exclusively accessible to the apparatus;

means for storing the data on the plurality of target clients according to the non-transparent sequence, wherein the source client and the plurality of target clients are organized in a grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers;

means for retrieving the plurality of backup data packets backed up on the plurality of target clients; and means for assembling the retrieved plurality of backup data packets in the non-transparent sequence of the packet identifiers.

36. The apparatus of claim 35, wherein the storing means further mapping the data to source client using the unique data identifier corresponding to the data, the unique data identifier identifying original, non-backup data and indicating a uniqueness of the data as compared to other data, and the storing means further creates a redundant backup data packet for each backup data packets prior to storing the backup data packets on the plurality of target clients and stores the redundant backup data packet on one of the plurality of target clients according to the non-transparent sequence.

37. The apparatus of claim 35, the means for storing data creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

38. A programmable hardware device storing executable code that is executed on a processor to carry out a method for backing up data across a plurality of clients, the method comprising:

receiving data to be backed up from a source client, the data comprising a plurality of backup data packets;

generating a non-transparent sequence comprising packet identifiers for each of the plurality of backup data packets arranged in an order that a plurality of backup data packets are stored from the source client to the plurality of target clients, wherein the non-transparent sequence is unique and exclusively accessible to a global sequence manager;

storing the data on the plurality of target clients according to the non-transparent sequence, wherein the source client and the plurality of target clients are organized in a grid computing system, wherein each physical distance between each target client storing backup data packets is not less than a specified client packet proximity minimum distance parameter and not more than a specified client packet proximity maximum distance parameter and each physical distance between the source client and each target client storing backup data packets is not less than a specified client backup proximity minimum distance parameter and not more than a specified client backup proximity maximum distance parameter, the specified client packet proximity minimum distance parameter, the specified client packet proximity maximum distance parameter, the specified client backup proximity minimum distance parameter, and the specified client backup proximity maximum distance parameter each specifying a distance value measured in a unit selected from miles and kilometers;

retrieving the plurality of backup data packets backed up on the plurality of target clients; and assembling the retrieved plurality of backup data packets in the non-transparent sequence of the packet identifiers.

39. The programmable hardware device of claim 38, wherein the method further comprises managing a metadata file descriptive of the data backed up on the plurality of target clients, the metadata file comprising one of a global client profile, a source client profile, a source data record, a target data record, a data assembly record, and a global backup log.

40. The programmable hardware device of claim 38, wherein the method further comprises using a unique data identifier corresponding to the data to map the data to the source client, the unique data identifier identifying original, non-backup data and indicating a uniqueness of the data as compared to other data.

41. The programmable hardware device of claim 40, the method further comprising creating a source client profile for the data, the source client profile comprising the unique data identifier, a data source location, a data packet compression, a data packet redundancy, a data packet encryption, a data backup proximity comprising the specified minimum distance packet proximity parameter and the maximum distance packet proximity parameter, a data synchronization parameter indicating how often each target client should be synchronized with the source client, and the non-transparent sequence, the packet storage module further creating a source data record for each packet, the source data record comprising the unique data identifier, the packet identifier for the packet, and at least one target identifier for each target client storing the packet.

42. The programmable hardware device of claim 38, wherein the method further comprises separating the data into the plurality of backup data packets and storing the backup data packets on the plurality of target clients.

43. The programmable hardware device of claim 38, wherein the method further comprises modifying the data prior to storing the data on the plurality of target clients, wherein modifying the data comprises one of compressing, encrypting, and duplicating at least a portion of the data.

44. The method of claim 38, the method further comprising creating a redundant backup data packet for each backup data packets prior to storing the backup data packets on the plurality of target clients and storing the redundant backup data packet on one of the plurality of target clients according to the non-transparent sequence.

* * * * *